L. A. PARRISH.
ATTACHING DEVICE FOR ELECTRIC FIXTURES.
APPLICATION FILED FEB. 1, 1909.

922,623.

Patented May 25, 1909.

Witnesses:
H. A. Lamb.
S. W. Atherton.

Inventor
Louis A Parrish
By Attorney
A. M. Wooster

UNITED STATES PATENT OFFICE.

LOUIS A. PARRISH, OF GREAT BARRINGTON, MASSACHUSETTS.

ATTACHING DEVICE FOR ELECTRIC FIXTURES.

No. 922,623.　　　　　Specification of Letters Patent.　　　Patented May 25, 1909.

Application filed February 1, 1909. Serial No. 475,311.

*To all whom it may concern:*

Be it known that I, LOUIS A. PARRISH, a citizen of the United States, residing at Great Barrington, county of Berkshire, State of Massachusetts, have invented a new and useful Attaching Device for Electric Fixtures, of which the following is a specification.

This invention relates to means for attaching electric fixtures to what are commonly called outlet boxes or wall boxes which boxes are often embedded in a wall and to which are led the electric cables or conductors. Whenever a connection is to be made with a conductor the terminal of which is within such box, it is necessary to expose the interior of the box to enable the electrician to make the connections.

One of the objects of this invention is to provide means whereby sufficient of the interior of the outlet box may be exposed for the operation of connecting without disturbing any of the plaster or wall surface in which the box is embedded.

Other objects are to provide a simple and secure means for attaching the fixture after the connection has been made inside of the box.

To these ends the invention consists in the construction and combination of parts substantially as hereinafter described and claimed.

Figure 1:
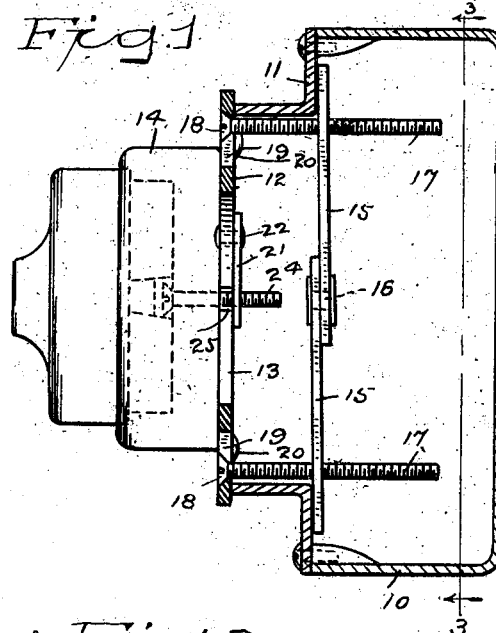
Figure 2:
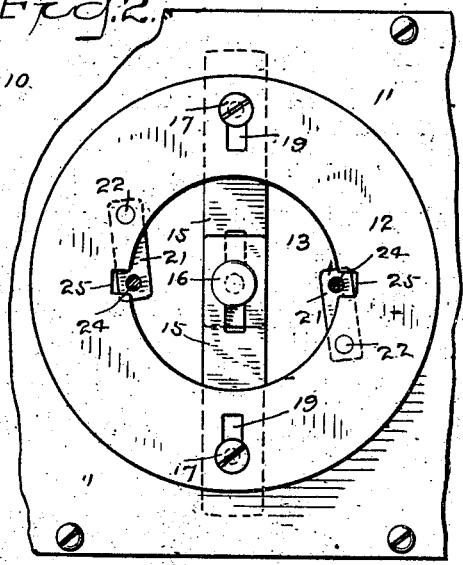
Figure 3:
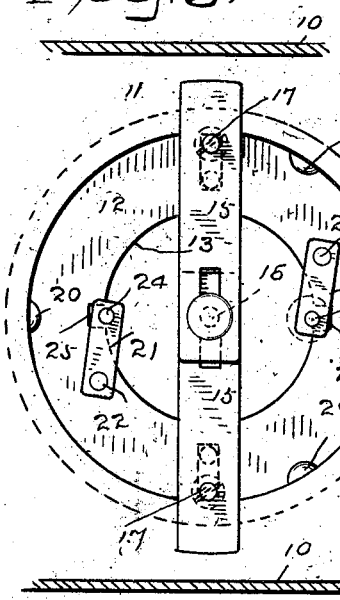
Figure 4:
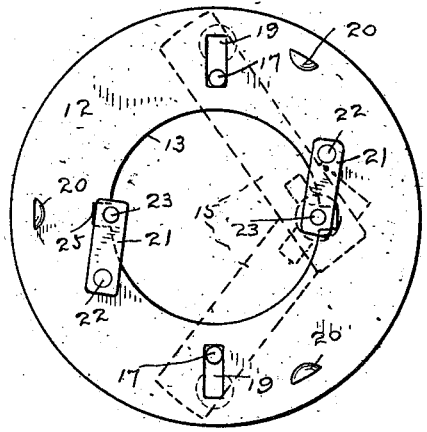

Of the accompanying drawings:—Figure 1 is a section through an ordinary form of outlet box or wall box having my improved means for attaching an electric fixture thereto. Fig. 2 is an elevation from the left of Fig. 1, the porcelain block of the fixture being removed, and the screws which hold such block in place being shown in section. Fig. 3 represents a section on line 3—3 of Fig. 1 looking in the direction of the arrows, said Fig. 3 showing only portions of two of the sides of the box. Fig. 4 is an elevation of the plate which carries the collapsible locking bar the latter being indicated only by dotted lines.

Similar reference characters indicate the same or similar parts in all of the views.

An outlet box or wall box of an ordinary type is indicated at 10, but I desire it to be understood that I do not limit myself to any particular form or type of box to which the cables or conductors lead, using the term outlet box only for convenience of reference and not for any purpose of limitation. Such box it is to be understood is usually formed with weakened portions which may be broken out, or with completely formed openings, through which the conductors or cables lead to the interior of the box. The box is shown as provided with a cover portion 11. In practice the box and its cover portion is usually embedded in the material of a wall or ceiling, with the edge of the outstanding flange of the cover portion flush with the surface of such wall or ceiling.

To enable any one of a variety of forms of electric fixtures or porcelain blocks to be firmly attached to the outlet box, I provide a plate to which such fixture or block is removably connected, and which plate carries collapsible locking means which may be passed through the opening in the cover of the box and then clamped in place. Said plate is indicated at 12 and is formed with a central opening 13. For convenience of illustration I have simply shown a two-part porcelain block 14 as the fixture which is attached to said plate. As such block or fixture forms no part of my present invention, I have not illustrated it in complete detail.

The collapsible locking bar comprises two members 15 which overlap and are slotted at their inner ends, a rivet 16 passing through said slots. The rivet is not headed down tightly but is left so as to permit the bar as a whole to be lengthened or shortened freely, or so as to be swung from a diametrical position as shown in Figs. 1, 2 and 3 to an angular position indicated by dotted lines in Fig. 4.

Each member 15 is formed with a threaded hole for a screw 17, the head 18 of which is accessible from the outer side of the plate 12, said plate being formed with slots 19 through which the screws pass and along which the screw heads may be shifted to enable the extreme outer ends of the members 15 to be drawn inward when said members are collapsed to shorten the bar as a whole or when swung to the dotted line position of Fig. 4 so that the plate 12 and the screws 17 and the collapsible locking bar may be withdrawn or inserted through the opening in the cover 11 of the box. When the parts are inserted and the screws 17 shifted outward along the slots 19, the outer ends of the compound locking bar are projected under the shoulder of the cover portion 11, after which the screws 17 are tightened up so as to cause the ends of the locking bar to tightly clamp the parts in their relative positions shown in Figs. 1 and 2.

To center the plate 12 properly, I may form it with lugs 20 which fit inside the circular flange of the cover portion 11. In order that any one of a variety of forms or sizes of fixtures or porcelain blocks may be secured to the plate 12, I provide said plate with two arms 21 which are pivoted to said plate at 22 and have threaded openings 23 at their free ends. Said threaded openings 23 receive screws 24 which hold the fixture or block 14 in position. By swinging the arms 21 toward or apart from each other, the threaded apertures thereof may be varied in their relative positions considerably to enable smaller or larger fixtures 14 to be secured to the plate 12. Said plate is preferably formed with notches or recesses 25 to increase the distance apart to which the arms 21 may be swung.

Having described the operation and advantages of the invention in connection with the description of the structure, further reference to such operation and advantages will be unnecessary.

I do not wish to be understood as limiting myself to the specific details of construction illustrated and described, as the same may be variously modified within the limits of mechanical skill.

Having now described my invention, what I claim is:—

1. An attaching device for electric fixtures, comprising a plate for supporting the fixtures, and a collapsible locking member carried by said plate and having end portions adapted to engage, when projected, portions of an outlet box.

2. An attaching device for electric fixtures, comprising a plate to which the fixture may be connected, and a longitudinally collapsible locking bar carried by said plate and having end portions adapted to engage, when projected, portions of an outlet box.

3. An attaching device for electric fixtures, comprising a plate having an opening and formed with diametrical slots, screws passing through said slots, a compound locking bar variable in length and having threaded apertures for said screws, and means carried by said plate for securing a fixture thereto.

4. The combination with an outlet box having a shouldered cover, of a plate bearing on said cover said plate having an opening and radial slots, screws passing through said slots, and a collapsible locking device comprising two members having overlapping slotted inner ends pivotally connected and formed with threaded apertures for said screws, the other ends of the members of the locking device projecting under the shoulder of the cover.

In testimony whereof I affix my signature, in presence of two witnesses.

LOUIS A. PARRISH.

Witnesses:
F. L. SNOW,
J. C. FREIN.